US007635328B2

(12) United States Patent
Hinman et al.

(10) Patent No.: US 7,635,328 B2
(45) Date of Patent: Dec. 22, 2009

(54) BIOFUEL CENTRIFUGE

(75) Inventors: Jeffrey Maurice Hinman, Stanwood, WA (US); Robert Mark Palmer, Camano Island, WA (US)

(73) Assignee: Pacific Centrifuge, LLC, Stanwood, WA (US)

( * ) Notice: Subject to any disclaimer, the term of this patent is extended or adjusted under 35 U.S.C. 154(b) by 484 days.

(21) Appl. No.: 11/636,396

(22) Filed: Dec. 8, 2006

(65) Prior Publication Data

US 2007/0173397 A1 Jul. 26, 2007

Related U.S. Application Data

(60) Provisional application No. 60/748,793, filed on Dec. 9, 2005.

(51) Int. Cl.
*B04B 13/00* (2006.01)
*B01D 21/26* (2006.01)

(52) U.S. Cl. .............................. 494/37; 494/10; 494/2; 494/11; 494/27

(58) Field of Classification Search ................... 73/485, 73/445, 61.44; 324/439, 693; 494/1–3, 7, 494/10, 11, 37, 84; 210/85–89, 96.1, 109, 210/108, 143, 360.1, 374, 512.1, 739–740, 210/744–756, 781, 787; 700/266, 271, 272, 700/273

See application file for complete search history.

(56) References Cited

U.S. PATENT DOCUMENTS

| | | | | |
|---|---|---|---|---|
| 4,525,155 | A * | 6/1985 | Nilsson | 494/3 |
| 4,700,117 | A * | 10/1987 | Giebeler et al. | 388/814 |
| 5,287,265 | A * | 2/1994 | Hall et al. | 700/83 |
| 5,316,667 | A * | 5/1994 | Brown et al. | 210/85 |
| 5,370,599 | A * | 12/1994 | Marque et al. | 494/37 |
| 5,416,407 | A * | 5/1995 | Drafts | 324/117 H |
| 5,496,254 | A * | 3/1996 | Keller et al. | 494/7 |
| 6,018,239 | A * | 1/2000 | Berkcan et al. | 324/127 |
| 6,143,183 | A | 11/2000 | Wardwell et al. | |
| 6,549,817 | B1 * | 4/2003 | Audibert | 700/50 |
| 6,607,473 | B2 * | 8/2003 | Collier | 494/37 |
| 6,828,808 | B2 * | 12/2004 | Srinivasan et al. | 324/693 |
| 6,860,845 | B1 * | 3/2005 | Miller et al. | 494/1 |
| 2005/0081435 | A1 | 4/2005 | Lastella | |
| 2008/0054745 | A1 * | 3/2008 | Sentmanat | 310/89 |

FOREIGN PATENT DOCUMENTS

DE 4107485 A1 * 9/1992

* cited by examiner

*Primary Examiner*—Tony G Soohoo
*Assistant Examiner*—David C Mellon
(74) *Attorney, Agent, or Firm*—Graybeal Jackson LLP

(57) ABSTRACT

A centrifuge includes a provision for measuring a physical parameter corresponding to the position of a phase interface inside the centrifuge. The centrifuge is controlled responsive to the inferred position of the phase interface.

55 Claims, 7 Drawing Sheets

120
530
122
532
538
536
534
501
516
518
130
514
202a, 202b, 206a, 206b
528
112
526
104
508
524
110
522
520
512
518
506
504
510
102
502

BIOFUEL CENTRIFUGE

CROSS-REFERENCE TO RELATED APPLICATIONS

The present application claims priority from U.S. provisional patent application No. 60/748,793, entitled BIOFUEL CENTRIFUGE, filed Dec. 9, 2005, by Jeffrey M. Hinman and Robert M. Palmer, which is incorporated herein by reference in its entirety and for all its teachings and disclosures.

TECHNICAL FIELD

Embodiments according to the present disclosure relate to centrifugal separation processes and more particularly to centrifugal separation controllers, methods, and apparatuses that monitor one or more physical properties to control a process parameter.

BACKGROUND

In the biofuels industry, and particularly with respect to biodiesel (methyl esters) there is typically a need to separate reaction products. For example the byproduct glycerol may be produced along with biodiesel fuel in process reactions and may need to be separated from biodiesel. Wash products may also need to be separated from biodiesel and/or other byproducts.

Prior art centrifuges may rely on complex construction of disk stacks, complicated angles and expensive parts, weirs, etc. Such constructions may result in relatively inflexible operation and limit a given centrifuge to a relatively specialized role, such as being limited to a relatively specific feed stream or requiring manual adjustment to modify feed stream composition, for example.

There is a need for a faster, more efficient, less complex, and/or cheaper methods of separation. Thus, there has gone unmet a need for improved methods and apparatuses. Some embodiments according to the present disclosure provide these and other advantages.

OVERVIEW

Biofuels and biodiesel are becoming increasingly important sources of energy for the world economy, particularly as proven reserves of petroleum are depleted. The production of fuel from renewable resources typically involves chemical reactions that produce materials containing relatively large amounts of impurities. Some embodiments provide improved approaches to isolating relatively pure products from the impurities, and thus are important for producing affordable alternative fuels.

One embodiment relates to a centrifuge that monitors a physical property and responsively controls one or more operational parameters, such as one or more flow rates, for example.

According to one embodiment, a physical property is used to detect the separation of biodiesel and glycerol.

According to another embodiment, a physical property is used to detect the separation of biodiesel and wash water products.

According to an embodiment, at least one phase separation is monitored in a centrifugal separator by measuring light transmission properties of a least one of the phases.

According to an embodiment, an electrical conductivity test device may be used to detect the separation between relatively conductive and relatively non-conductive phases.

According to other embodiments, other physical property detectors may be used to detect separation and control a flow rate.

According to another embodiment, a physical property may be sensed and used to control other process attributes such as, for example, a rate of rotation of a centrifuge.

According to other embodiments, other physical properties such as sound propagation, viscosity, temperature, etc. may be sensed to determine the relative position of a phase interface in a centrifuge. The centrifuge includes a provision for measuring a physical parameter corresponding to the position of a phase interface inside the centrifuge. The centrifuge is controlled responsive to the inferred position of the phase interface.

DETAILED DESCRIPTION

The production of biodiesel typically includes one or more transesterification reactions, in which a mixture of glycerol and biodiesel is formed. The biodiesel and glycerol may be separated to create a product and byproduct. According to embodiments, a centrifuge may be used to separate the product from the byproduct as well as separate additional impurities during various process steps.

Embodiments disclosed herein are not limited to biofuel production. For example, embodiments may be applied to a wide range of process industries and applications such as production of chemicals, production of other fuels, processing of pharmacological fluids, food and drink processing, etc. However, the embodiments are disclosed in the context of biofuel production to foster ease of understanding by the reader. During biodiesel processing, there are generally four instances where apparatuses and methods disclosed herein may be especially valuable to increase separation speed of fluids and shorten the time required to produce fuel. They are listed as follows:

1. Vegetable oil (virgin, tallows, yellow grease) and water separation;
2. Acid esterification to convert free fatty acids to biodiesel that is neutralized with re-added catalyst containing glycerol, and then separated;
3. Biodiesel and glycerol separation after reaction; and
4. Biodiesel and wash water separation after washing of the biodiesel.

The above situations involve liquid-liquid separation that may particularly benefit from the disclosed centrifuge operable to provide automatic flow rate adjustment. In addition, embodiments may be used to separate density-differentiated components in other and in mixed states such as liquid-solid, gas-gas, etc. for example.

Figure 1:
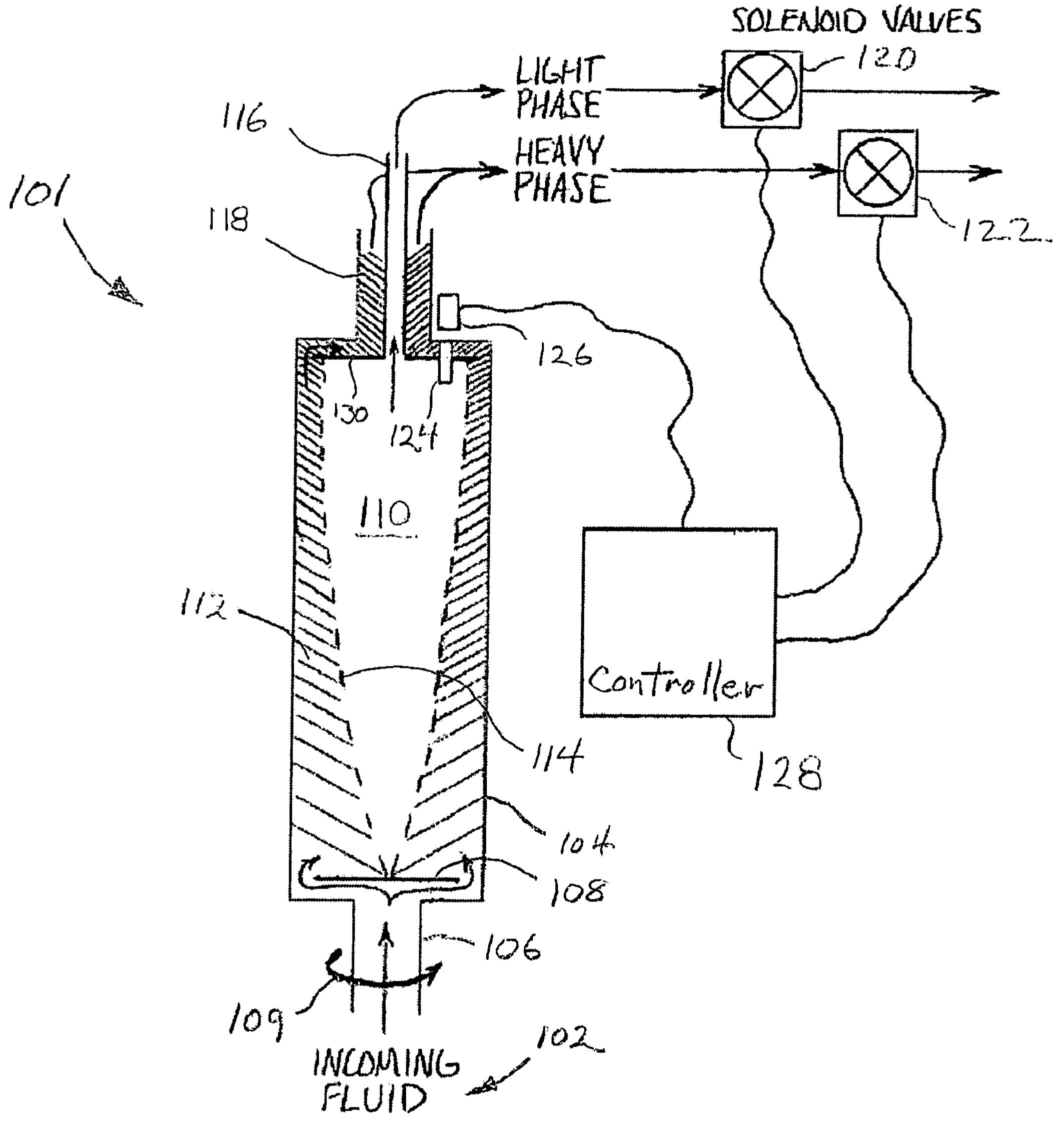
FIG. 1 is a simplified sectional view of a centrifuge and block diagram of a control system operable to control flow through the centrifuge according to an embodiment.

FIG. 1 is a simplified sectional view of a centrifuge 101 with a controller 128 coupled to a sensor 124 for phase detection and operable to drive valves 120, 122 for flow control according to an embodiment. An incoming fluid 102 enters a centrifuge body 104 through an inflow pipe 106. An optional divider plate 108 may direct incoming fluid toward the periphery of the body 104 (where centrifugal force is greatest and hence separation rates are highest) and help to accelerate the incoming fluid into a rotation indicated by arrow 109. Under rotational acceleration, the fluid in the centrifuge body 104 separates into a light phase 110 nearer the center of the centrifuge body 104 and a heavy phase 112 nearer the outer diameter of the body. In some systems, and particularly systems formed from immiscible fluids such as hydrocarbons and glycerol characteristic of biofuel and biodiesel production, a relatively distinct interface surface 114 may form between the light phase 110 and heavy phase 112. Generally speaking, the light phase may be comprised of a fluid having a relatively low density and the heavy phase may be comprised of a fluid having a relatively high density. As the fluid enters the centrifuge body 104, the entrance shown in the example of FIG. 1 as being near the bottom of the body, the interface surface 114 between the phases may be indistinct with a relatively high percentage of high density fluid within the light phase and a relatively high percentage of low density fluid within the heavy phase. As the fluid flows (e.g. upward) within the body 104, the centrifugal force forces migration ("rising") of additional low density fluid (and/or solids) toward the center to form a relatively larger diameter light phase; and migration ("sinking") of additional high density fluid (and/or solids) toward the periphery to form the heavy phase. Especially for systems that include immiscible fluids of differing specific gravity (i.e. density), a relatively distinct interface surface 114 may form near the exit end (e.g. top) of the centrifuge body 104. As is known, the centrifuge body 104 may include a plurality of plates (not shown) configured to regulate flow, maintain rotational velocity, reduce turbulence, promote phase separation, etc. Additionally, and/or alternatively, the centrifuge body 104 may included a plurality of separation chambers, flow lines, and other features without departing from the spirit and scope.

After centrifugal separation, the light phase 110 may be withdrawn from the central portion of the centrifuge body 104 through a light phase outflow pipe 116. Similarly, the heavy phase 112 may be withdrawn from the peripheral region of the body 104 around a divider plate 130, and through a heavy phase outflow pipe 118. According to embodiments, the flow and flow rates of the light phase 110 and heavy phase 112 through the system may be regulated by respective valves 120 and 122, and/or pumps, etc.

With respect to typical applications described above, vegetable oils and biodiesel have a lower density (specific gravity) than glycerol and water. Furthermore, biodiesel and vegetable oils may be immiscible with glycerol or water. For simplicity, the description below will focus on one of the separations described above, that being the separation of biodiesel and glycerol.

Because glycerol is more dense (has a higher specific gravity) than biodiesel, the heavy phase 112 may be formed substantially of glycerol and the light phase 110 may be formed substantially of biodiesel.

In many cases, the light phase 110 and heavy phase 112 may be characterized by differing physical properties in addition to the density difference that drives separation. In the case of the biodiesel production example, for instance, the vegetable oils and biodiesel have significantly lower electrical conductivity than water and/or glycerol. In particular, the heavy glycerol phase has a higher electrical conductivity than the light biodiesel phase. As will be discussed later, biodiesel and glycerol phases also differ in light transmissivity, especially in the red portion of the spectrum.

The exemplary embodiment of FIG. 1 includes an electrical conductivity sensor 124 operable to measure electrical conductivity of fluid at and/or near a radius from the center of rotation of the centrifuge body 104. Since the centrifuge rotates during operation, the sensor 124 does not have a fixed angular position with respect to the centrifuge body 104, but rather rotates with the body 104. An interface 126 is configured to receive conductivity data from the conductivity sensor 124 intermittently as the sensor 124 rotates past its position. As will be explained more fully below, the interface 126 may also be operable to induce current flow in the conductivity sensor 124 and thereby provide at least intermittent power to the sensor 124 sufficient to measure and transmit conductivity. Other types of physical property sensors 124 may similarly be provided power at least intermittently by the interface 126.

Because of the difference in physical properties (e.g. electrical conductivity) between the light and heavy phases 110, 112, the sensor 124 may be used to sense the position of the phase interface surface 114. That is, for a biodiesel/glycerol system, the sensor 124 may tend to measure a relatively lower electrical conductivity when the phase interface surface 114 is at a radius greater than the radius at which the sensor 124 is positioned (as shown), and a relatively higher electrical conductivity when the volume of heavy phase 112 in the centrifuge body 104 is greater, causing the phase interface surface 114 to be formed at a radius less (closer to the centerline of the centrifuge) than the radius at which the sensor 124 is positioned. Thus, the sensor 124 may provide an input for control of an operational parameter of the centrifuge 101, logging of data, etc. responsive to the position of the phase interface surface 114. Operational parameters that may be controlled include the state of valves 120, 122 that respectively control the flow rate of light and heavy phases, the state of one or more pumps that control flow through the centrifuge, the rotational velocity of the centrifuge body 104, the routing of output streams (e.g. based on detected purity), etc.

The interface 126 may be coupled to a controller 128 operable to open and close valves 120, 122 responsive to the position of the phase interface surface 114. According to an embodiment, the controller 128 may hold the light phase valve 120 open until the radial position of the phase interface surface 114 nears or passes the sensor 124. When the controller 128 senses the corresponding increase in electrical conductivity through the intermittent interface 126, the controller 128 closes the light phase outflow valve 120 and simultaneously opens the heavy phase outflow valve 122. The controller 128 may hold this state for a number of revolutions and/or until the sensor 124 is again read by the controller 128 to indicate that the electrical conductivity has decreased, indicating that the phase interface surface has again returned to a position nearer the periphery of the centrifuge body 104. When appropriate, the controller closes the heavy phase outflow valve 122 and substantially simultaneously opens the light phase outflow valve 120 to again allow the light phase to flow through the system.

According to alternative embodiments, the controller 128 may include a capability to hold the outflow valves 120, 122 at intermediate positions wherein fluid is allowed to simultaneously flow through both valves at a proportion appropriate to maintain a desired position of the phase interface surface 114. According to alternative embodiments the controller 128 may include a capability to monitor and store a succession of sensed physical parameter values. According to alternative embodiments, the controller 128 may include a capability to control alternative and/or additional the process parameters such as controlling a rotational velocity, controlling a pump, controlling a valve, controlling an input flow rate, controlling an output flow rate, controlling a temperature, controlling a composition of the input fluid, controlling an output routing of the separated heavy and light phases, and controlling a wash cycle.

According to embodiments, physical parameter feedback may be used to substantially automatically adapt the operation of the centrifuge to varying input fluid compositions. For example, an input fluid having relatively higher glycerol concentration may automatically be compensated for by the controller causing the heavy phase outflow valve 122 to open more often. Similarly, flow to the centrifuge may be switched to a different source, for example a washed biodiesel source, and the centrifuge used to separate wash fluids from the biodiesel. Centrifuges may be ganged in parallel and/or cascaded to provide multi-stage optimization. Such an approach may, for example, allow for dynamic allocation of process resources, efficient operation across a range of capacities, adaptability across feedstocks and reactions, production of various grades of products, improved maintenance and repair capability, etc.

Figure 2:
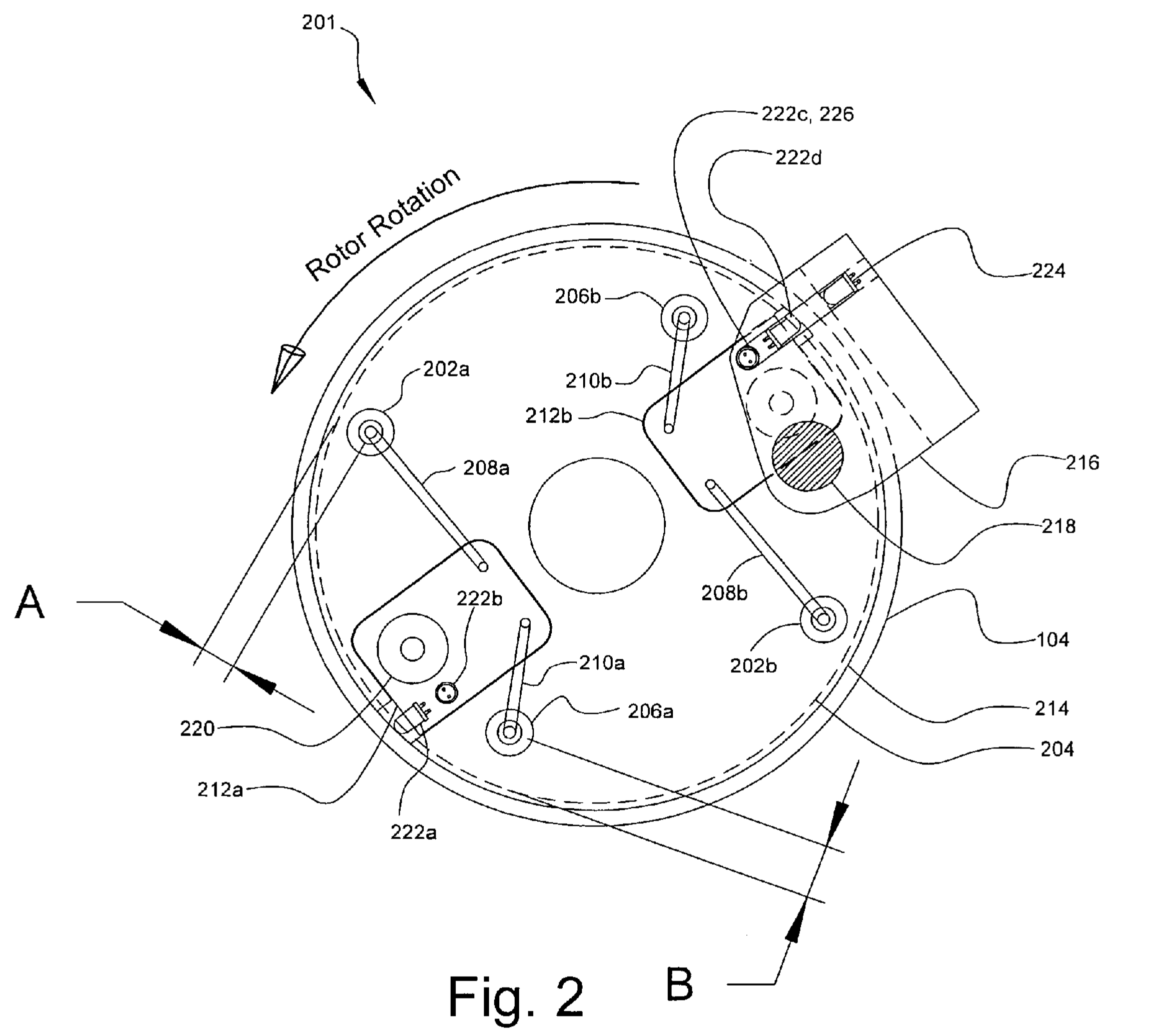
FIG. 2 is an end view of the centrifuge of FIG. 1 showing an arrangement of sensors and interface according to an embodiment.

FIG. 2 is an end view 201 of a centrifuge of FIG. 1 showing details of sensors and interface according to an embodiment. As described above, vegetable oils and biodiesel generally conduct far less electricity than water or glycerol. To detect this difference in this particular application, stainless steel sensor studs are used to detect conductivity of fluids at differing radii within the centrifuge. One or more first sensor studs 202 are provided at a first distance A from the inner wall 204 of the centrifuge body 104. In the example of FIG. 2, there are two first sensor studs 202 indicated as 202*a* and 202*b*. One or more second sensor studs 206 are provided at a second distance B from the inner wall 204 of the centrifuge body 104, where B>A. In the example of FIG. 2 there are two second sensor studs 206 indicated as 206*a* and 206*b* corresponding respectively to first sensor studs 202*a* and 202*b*. The sensor studs 202*a*, 206*a* are respectively coupled through electrical leads 208*a*, 210*b* to a sensor circuit 212*a*.

For some applications a single sensor circuit 212 and one or more associated sensor stud(s) may be sufficient. In the exemplary embodiment of FIG. 2 a second set of sensor studs 202*b*, 206*b* are respectively coupled through electrical leads 208*b*, 210*b* to a second sensor circuit 212*b*. The second sensor circuit provides redundancy and a higher frequency of data capture, as will be explained more fully below. According to an embodiment, the sensor circuits 212 may include printed circuit boards.

The sensor circuits 212 are mounted on an end plate 214 that seals the end of the centrifuge body or rotor 104 at the outflow end of the centrifuge. Thus, the sensor circuits 212 spin with the centrifuge body 104. Because of their differing radial distances, the sensor studs are configured to detect conductivity of fluids at differing radii within the centrifuge body 104 at its outflow end. Sensor studs 202 are configured to sense conductivity at a radial distance A from the inside wall 204 of the centrifuge body 104. Sensor studs 206 are configured to sense conductivity at a radial distance B from the inside wall 204 of the centrifuge body 104. The centrifuge may thus be controlled to maintain the position of the phase interface surface (114 in FIG. 1) at the outflow end of the centrifuge at a radius r having the relationship R−B<r<R−A, where R is the radius of the inside wall 204 of the centrifuge body 104. According to an embodiment, R=3.0 inches, A=0.475 inch, and B=0.675 inch. As will be described more fully below, this may be done by controlling outflow valves so as to maintain the conductivity sensed by the sensor stud(s) 206 at a value corresponding to the light phase conductivity, and the conductivity sensed by the sensor stud(s) 202 at a value corresponding to the heavy phase conductivity. Alternatively, this may be described as maintaining a target difference in measured conductivity between the sensor stud pair (s).

While the use of one or more pairs of sensor studs 202, 206 has been found to be advantageous, for example to reduce the frequency of cycling the outflow valves, separately control the heavy phase and light phase outflow valves, to determine phase purity gradients, etc.; sensors having one or more studs at a single radius may also be appropriate for some embodiments. In such a case, the sensor stud may be capable of determining whether the phase interface surface has a radius less than or greater than its position. Similarly a larger number of sensor studs may be used to sense one or more physical properties across a greater number of radial distances. Sensor types may similarly be mixed, for example with a given sensor tip sensing electrical conductivity, a second sensor tip sensing light transmissivity, perhaps a third sensor tip sensing temperature, etc.

As indicated above, the sensor circuits 212 spin with the centrifuge body 104. A fixed interface 216 may be configured to interrogate the sensor circuit 212 as it rotates past the fixed position of the interface. The interface 216 thus acts as an intermittent interface, intermittently interrogating the sensor circuit(s) 212 as it passes and reporting the result to the controller (not shown). The fixed interface 216 may be further configured to power the sensor circuit 212 as it passes.

To power the sensor circuit 212, the interface 216 includes a magnet 218, which may for example include a permanent rare earth magnet. The sensor circuit 212 includes a coil 220 that is induced to flow current as it rotates past the magnet 218. This induced current powers the sensor circuit 212 while the coil 220 is near the magnet 218.

The sensor circuit 212 may include amplification logic that reduces the amount of current used for detection. The reduced current may increase the service life of the sensor studs by reducing current-induced corrosion. When the sensed fluid completes a circuit between a sensor stud 202, 206 and the centrifuge rotor 104 (e.g., sensing relatively high electrical conductivity such as that of glycerol or water), a corresponding indicator 222 such as a red visible LED emits light indicating the conductivity sensed by each sensor stud. The system may use various approaches to reduce or eliminate ambiguities as to which sensor stud 202, 206 corresponds to the indicated value. According to an embodiment, one indicator 222 faces horizontally while the other indicator 222 faces vertically, thus reducing the chance of interfering.

In the exemplary embodiment, the interface 216 includes contains two NPN phototransistor detectors 224, 226 that substantially align with the LED emitters 222 at least momentarily as they rotate past. The magnet 218 and coil 220 may be aligned respectively relative to the detectors 224, 226 and indicators 222 such that the indicators 222 are powered at an appropriate time. According to an embodiment, the elements are aligned such that the indicators 222 are powered by the magnet-coil induction substantially simultaneously with their alignment with the detectors 224, 226.

Referring back to FIG. 1 in view of FIG. 2, when a detector 224, 226 goes to ground responsive to sensing light from the respective indicator 222, a circuit such as a digital circuit in the controller 128 receives the signal. A voltage comparator in the controller circuit analyzes the position of the phase interface surface 114 and responsively fires selected solenoid valves 120, 122 to control the flow of the phases 110, 112 through centrifuge 101. Owing to the intermittent interface, the last received detected values may be latched, for example until the next measurement arrives or alternatively for a plurality of measurement intervals, and the valves 120, 122 held in the selected state until a different value is latched.

According to an embodiment, the fluid pressure in the centrifuge 101 may be maintained, allowing the 102 incoming flow to pump the outgoing separated flow through outflow pipes 116, 118 with positive pressures. While one embodiment completely opens or closes the solenoid air pneumatic valves 120, 122 responsive to detection of the fluid physical property(ies), other embodiments may modify this approach to allow for variable flow rate through the valves 120, 122. Additionally, one set of sensor studs 202 at distance "A" may be used as input to control one or more heavy phase outflow valves while a second set of sensor studs 206 at distance "B" may be used to substantially independently control one or more light phase outflow valves.

While the example above uses light energy to transmit physical property information, alternative communication media may be used to provide communication between the sensor circuit 212 and the interface 216. For example an electrical signal transmitted by commutator, a magnetic signal, a radio signal, etc. may be used in addition to or as an alternative to the optical interface.

Figure 3:
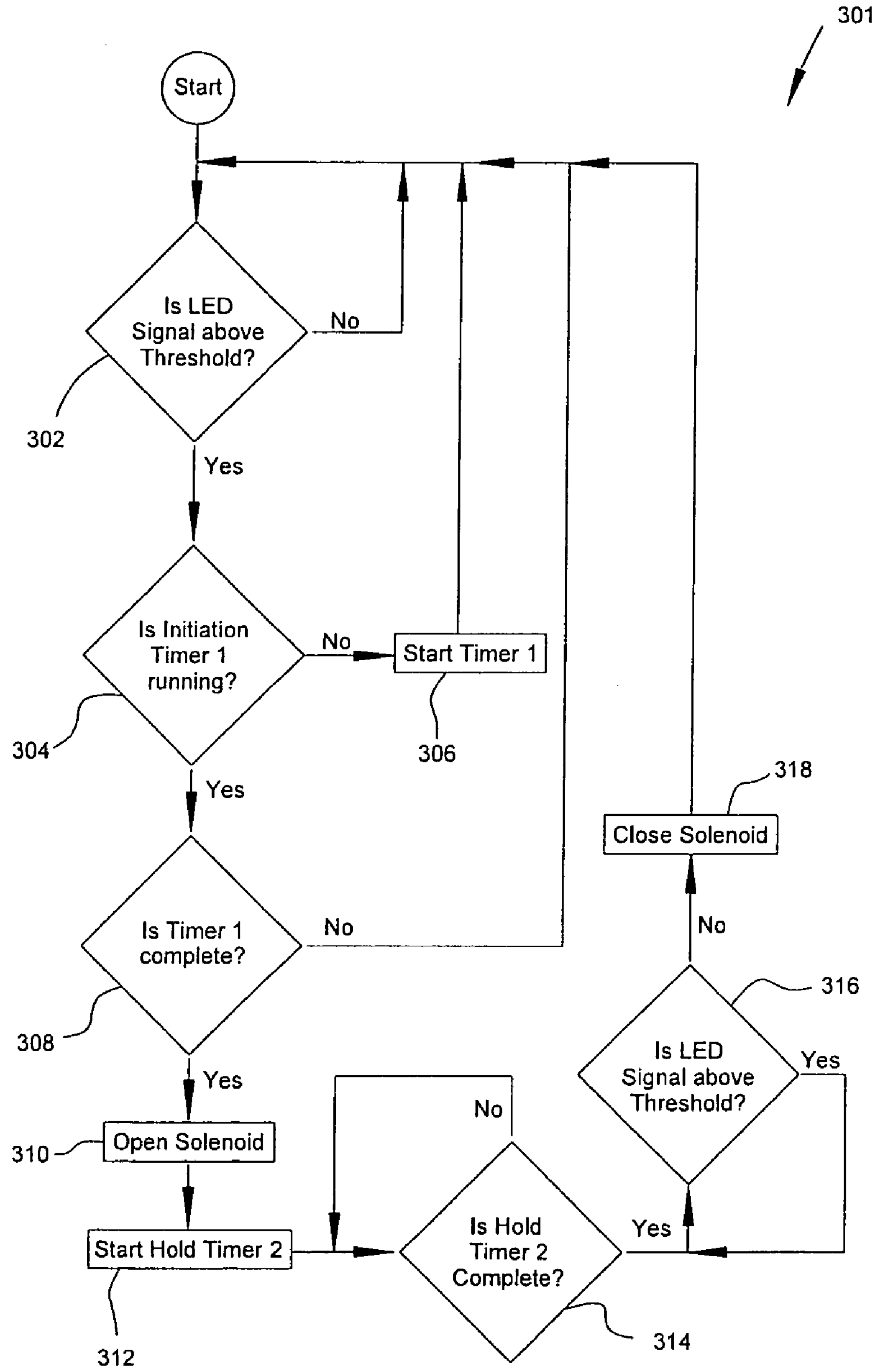
FIG. 3 is a simplified flow chart showing the operation of a digital circuit that analyzes the detected physical property information from the centrifuge and responsively drives one or more valves, according to an embodiment.

FIG. 3 is a simplified flow chart 301 showing the operation of one of two similar digital circuits that analyze the detected physical property information from the centrifuge, according to an embodiment. When the voltage comparator detects a signal for a set amount of time (to allow rotation of the unit), a latching circuit fires a relay to open, close, or adjust one or more solenoid valves to provide a selected flow until another set timer expires. If the signal continues to be detected (substantially at the previously received level), the relay continues to maintain the selected flow state until the signal is no longer detected or until it is detected at a different level.

To foster ease of understanding, the exemplary flow chart 301 is assumed to operate responsive to a single detected conductivity that drives an LED 222. Low output from the LED 222 corresponds to relatively low electrical conductivity at a position and high output from the LED corresponds to relatively high electrical conductivity at the position. Thus, the LED 222 output is relatively high when there is a relatively thick layer of heavy (conductive) phase 112 near the wall inside the centrifuge body 104. Similarly, the LED output is relatively low when there is a relatively thin layer of heavy (conductive) phase 112 near the wall inside the centrifuge body 104. The flow chart 301 shows logic to drive the state of a heavy phase outflow valve 122.

Referring to step 302, the program monitors intermittently received LED brightness. As long as the LED brightness is relatively low, i.e. when the condition is not met the state of the outflow valve 122 is not changed and the heavy phase is not allowed to flow through the centrifuge. After sufficient heavy phase (conductive) material accumulates in the centrifuge, the conductivity at the position of the sensor stud increases, causing the LED to provide higher light output. When the LED brightness rises above a threshold value, the condition of step 302 is met and the program proceeds to step 304.

At step 304, the program determines if Initiation Timer 1 is running. If the condition is not met, the program proceeds to step 306 and starts Timer 1 and loops back to step 302. Initiation Timer 1 acts as a noise filter that requires the LED threshold value measured in step 302 to remain above the threshold value for a period of time or number of revolutions before the program modifies the state of the heavy phase outflow valve. If, at step 304, the condition is satisfied and Timer 1 is running, the program proceeds to step 308 where the program determines if Timer 1 has been running long enough to satisfy its noise filter function. If the condition is not met, the program loops back to step 302. If the condition is met, the program proceeds to step 310. Timer 1 may be comprised of a range of known digital or analog timer types such as a countdown timer, an RC voltage charging circuit, etc. The timer may be set to increment or decrement as a function of a clock circuit, a simple passage of time, a number of centrifuge revolutions, etc.

When the program reaches step 310, it means the heavy phase 112 has reached a thickness where it is appropriate to remove some of the heavy phase from the centrifuge. At step 310, the controller opens a heavy phase outflow valve 122 to allow the accumulated heavy phase fluid to flow out of the centrifuge. According to some embodiments, reaching step 310 responsive to a sensed conductivity at a heavy phase sensor stud 202 may be used to control flow of only the heavy phase. Alternatively, a sensed conductivity at a heavy phase sensor stud may also be used to control flow of the light phase; wherein in the latter case the controller may substantially simultaneously close the light phase outflow valve 120 to prevent the light phase fluid from flowing out of the centrifuge.

After opening the heavy phase outflow valve, the program proceeds to step 312. In step 312 Hold Timer 2 is started. Hold Timer 2 acts as a filter to provide a minimum heavy phase flow period. The program proceeds to step 314 where it loops until Hold Timer 2 is complete, i.e. until the heavy phase outflow valve has been held open for a minimum time or minimum number of centrifuge revolutions. As with Initiation Timer 1, Hold Timer 2 may include a number of different timing known techniques. After the step 314 condition is true, the program proceeds to step 316.

At step 316, the program again compares the output of the LED to a threshold. The threshold used in step 316 may be substantially the same as or different than the threshold used in step 302. As long as the LED continues to indicate the heavy phase fluid has reached the thickness corresponding to increased conductivity at the measurement radius, the program loops while holding the heavy phase outflow valve open. When the heavy (conductive) phase 112 thickness is reduced to again indicate that light phase 110 extends out to the measurement radius, the conductivity at the measurement radius decreases, causing the LED output to decrease below the threshold tested in step 316, and the program proceeds to step 318. In step 318, the heavy phase outflow valve is closed and the light phase outflow valve is opened substantially simultaneously. The program then loops back to step 302 and the process is repeated while the centrifuge runs in separation mode. While the process described above refers to response to a sensed physical property at a heavy phase sensor stud 202, a similar process may be applied to control of light phase flow responsive to a sensed physical property at a light phase sensor stud 206. Similarly, for embodiments where more than one sensor stud 202 and/or more than one sensor stud 206 exist; parallel programs may respond to each sensor stud, for example controlling corresponding separate outflow valves; or the state of the plural sensor studs may be averaged, monitored in parallel, monitored and responded to separately, etc. to drive a single program 301.

While the description above has illustrated an embodiment that uses electrical conductivity to determine phase thickness in the centrifuge, other embodiments, as mentioned above, may rely on detection of alternative physical properties. For example optical transmissivity, optical density, color, light scattering, index of refraction, temperature, thermal conductivity, thermal diffusivity, heat capacity, sonic response, ultrasonic response, viscosity, rotational inertia, electrical capacitance, electrical resistivity, magnetic reluctance, magnetic diffusivity, freezing point, melting point, boiling point, condensation point, triple point, material phase change, chemical reactivity, and/or radioactivity may be detected. According to an embodiment shown in FIG. 4, light transmissivity may be used by measuring light transmission properties of at least one of the phases. For example a light emitter such as a light emitting diode (LED) or other light source may be arranged to emit light through a portion of fluid in the centrifuge. A light detector such as a photo transistor, photo diode, photo resistor, etc. monitors the amount of light transmitted through the portion of fluid. The amount of transmitted light is related to the thickness and/or purity of the portion of fluid. A signal produced by the light detector may be used to control a device such as a valve or pump operable to control a flow rate.

According to some embodiments, the light is passed through the liquid along an axis parallel to the separation plane (or cylinder). According to other embodiments, the light may be passed through the liquid along other lines such as along an axial path or an arc. A photo detector, which may for example comprise a photo transistor (typically NPN), photo diode (typically PIN), photo resistor, etc., may conduct to a terminal such as ground when biodiesel is detected, but less so when the darker glycerol is encountered. A voltage comparator switch may react to the different state of the photo detector. A control circuit may then fire solenoid valves to control the flow of the different separation densities in a centrifuge.

Figure 4:
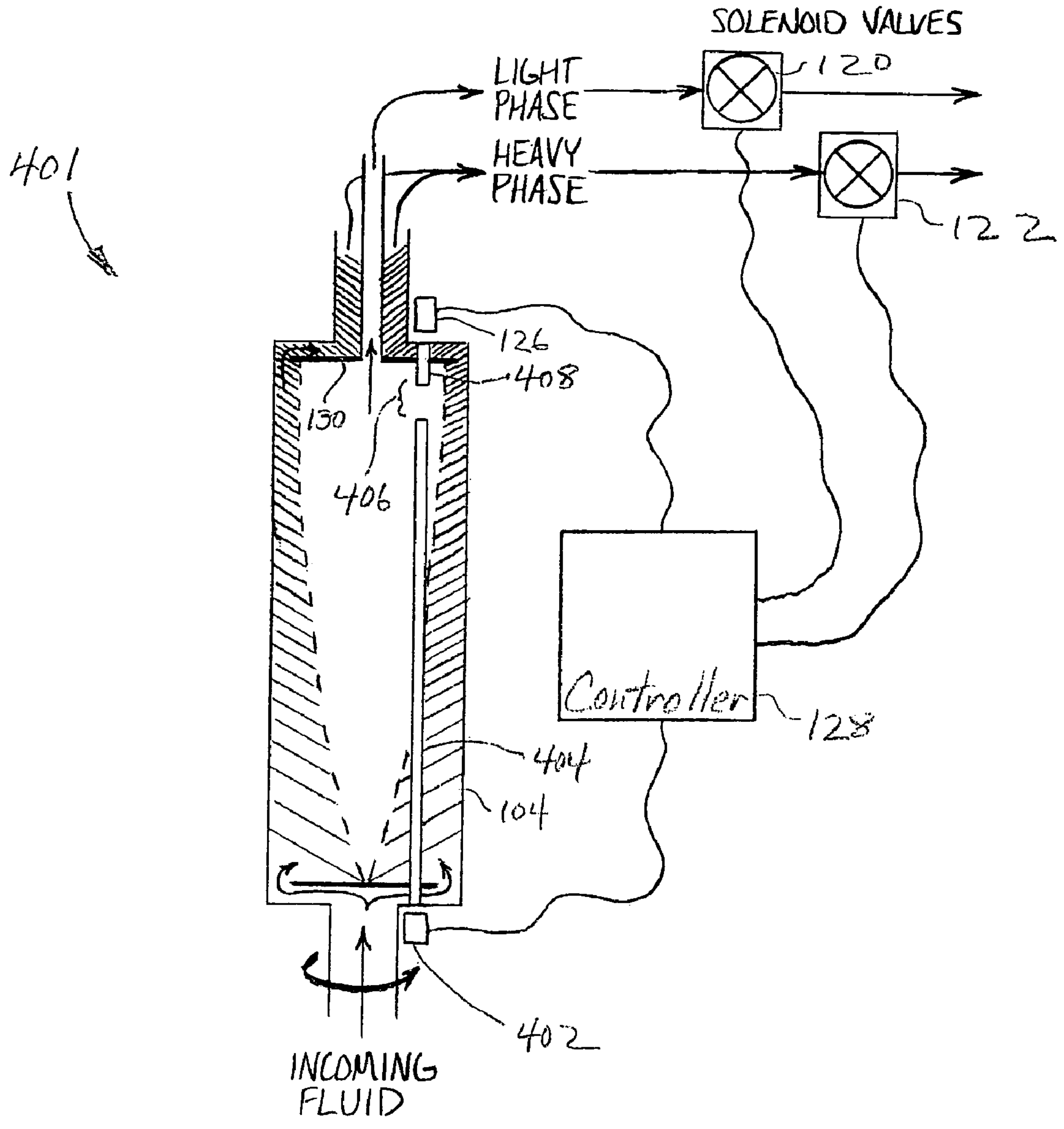
FIG. 4 is a simplified sectional view of a centrifuge and block diagram of a control system operable to control flow through the centrifuge according to an embodiment using light transmission.

FIG. 4 is a simplified view of a centrifuge and control system 401, the control system operable to control flow through the centrifuge according to an embodiment using light transmission through a portion of fluid.

The controller 128 drives a light emitter 402 to emit light of a known intensity. As the centrifuge body 104 rotates, a light pipe 404 periodically receives and transmits light from the light emitter 402. The light is transmitted along the light pipe 404 axially inside the centrifuge body at a sensing radius. The light exits the light pipe 404 and crosses a fluid gap 406 where it may be variably attenuated according to the light attenuation and transmission properties of the fluid in the gap. Light that traverses the fluid gap enters a second light pipe 408 that transmits the remaining light through the end plate of the centrifuge to be sensed by an intermittent interface 126.

An alternative embodiment uses one entry point for the light to enter and exit. Light may be propagated down the light conductive material, across a liquid gap, be reflected such as by a mirror, corner cube reflector, etc., across the liquid gap again, and be transmitted back up the light conductive material and exit the centrifuge. An emitter/detector pair may be used to emit and sense the light.

According to the embodiment, a variety of wavelengths of light may be used to detect the phase change. In this example, a red LED was chosen. When the heavy phase increases in thickness to subtend the light beam in the fluid gap 406, a relay switching circuit opens the heavy phase solenoid valve 122 and closes a light phase solenoid valve 120 in a manner similar to that describe and shown above in conjunction with FIG. 3. When the heavy phase solenoid valve 122 is opened, the heavy phase fluid flows from the perimeter of the centrifuge around the divider plate 130, and continues out through the top shaft portion for the heavy phase to a shaft seal assembly. The heavy phase then flows out through the heavy phase outflow valve 122 for collection.

When the heavy phase layer decreases in thickness sufficiently for the detector to detect higher transmissivity, the heavy phase outflow valve is closed and the light phase outflow valve is opened. The light phase then travels through the top shaft portion and to the shaft seal assembly. The light phase then flows out through the light phase outflow valve 120 for collection.

Biodiesel has a relatively high degree of light transmissivity and very low electrical conductivity. Glycerol that may be mixed with the biodiesel does not transmit light as effectively as the biodiesel and especially absorbs red light. Wash water, optionally with a soap added, may be added to the biodiesel. Water may conduct electricity, even if it is a minute amount due to the alkaline nature of the wash water, while biodiesel will tend to conduct electricity less.

The controller 128 may thus detect the electrical conductivity differences thereby infer a phase thickness and/or purity after and/or during separation.

According to an embodiment, the centrifuge may be placed in a vertical orientation. According to an embodiment, the internal construction may be simplified relative to the prior art. Such a design and/or orientation may allow for convenient draining of the unit to purge the fluid contents such as for batch processes or maintenance of continuous fuel processing. According to an alternative embodiment, the centrifuge may be placed in a horizontal position.

Figure 5:
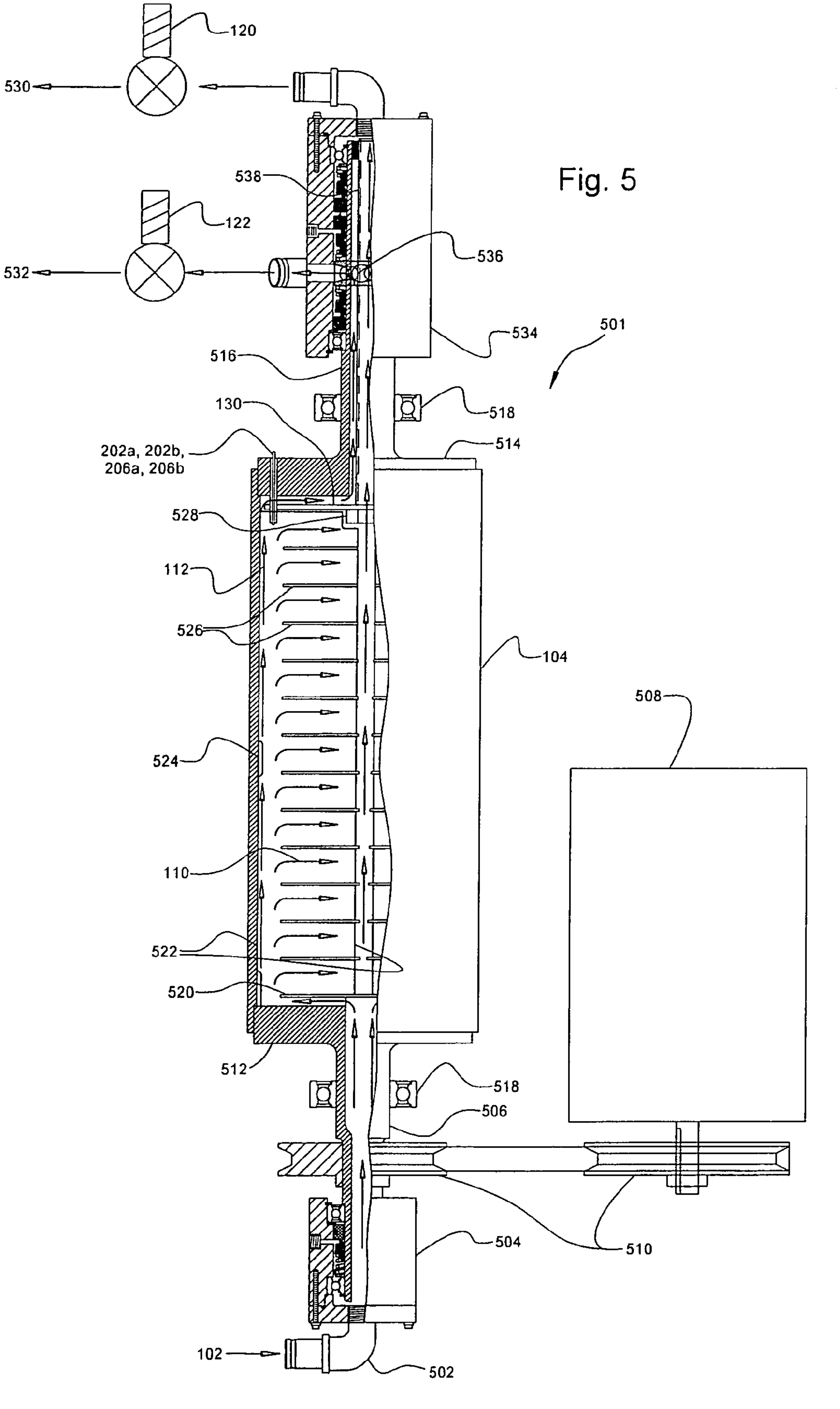
FIG. 5 is a cutaway view of a centrifuge according to an embodiment.

FIG. 5 is a cutaway view of a centrifuge 501 according to an embodiment. As mentioned above, applications for the centrifuge 501 include separating biodiesel from glycerol and separating biodiesel from wash water.

The incoming fluid 102 includes a mixture of high density and low density materials, referred to as the heavy and light phases. The incoming fluid 102 enters the centrifuge 501 through an inflow pipe 502. Fluid flows from the fixed inflow pipe 502 into the rotating assembly through a gap held by a shaft seal retaining housing 504. The fluid enters the centrifuge body 104 through the center of a spinning shaft 506. A 3-phase motor 508 driven by a variable frequency drive motor speed controller (not shown) drives the centrifuge by belt and pulleys 510. Rotation is imparted upon the centrifuge tube 104; end plates 512, 514; and upper shaft 516 through the lower shaft 506. The upper and lower shafts 516, 506 are supported by bearings 518. The end plates 512, 514 and internal components are held together by four tension rods (not shown) inside the centrifuge tube 104. The end plates 512 and 514 may be held against the centrifuge body 104 in substantially hermetic seal to prevent leakage.

While the end plates 512, 514 are illustrated as fitting within stepped grooves having outer diameter less than the outer diameter of the body 104, other arrangements are possible. For example the end plates may be made of diameter equal to or greater than that of the body 104. Similarly, one or more of the tension rods may be arranged external to the body 104.

The fluid travels up through the lower shaft 506 to a divider plate 520 and is pumped by impeller vanes which are part of four paddles 522 that span the length of the centrifuge body. The paddles have slots 524 at the perimeter to allow even distribution of heavy phase. These paddles are designed to quickly impart rotational velocity to the fluid which increases the rotational acceleration of the fluid to over 1000 times that of gravity when the centrifuge is rotating at 3750 RPM. Twelve divider plates 526, which may be substantially flat, are spaced at equal intervals to keep the fluid moving at the outer edges of the centrifuge where the rotational acceleration, and therefore separation, is the greatest.

Figure 6:
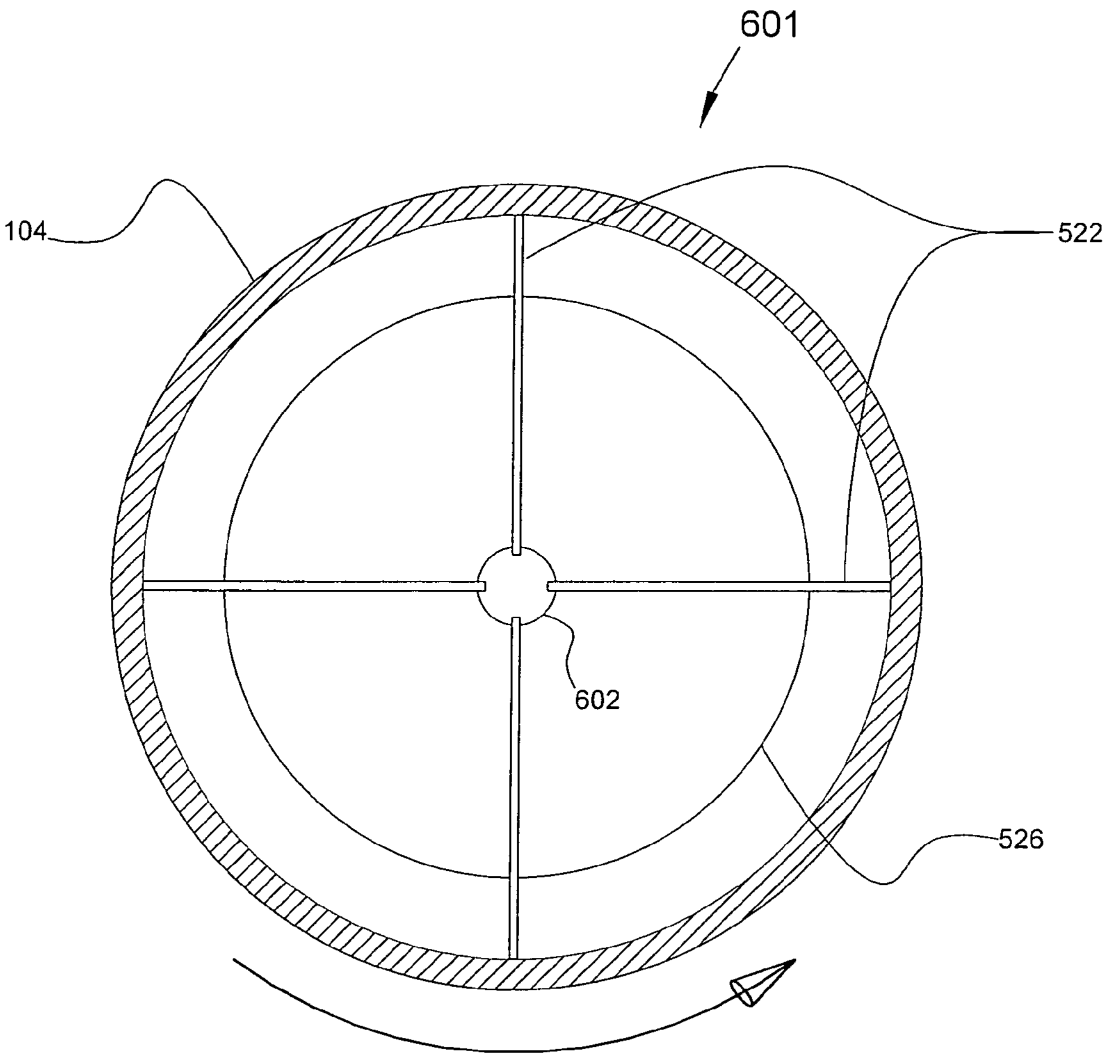
FIG. 6 is a cross-section of a centrifuge tube paddles and divider plates according to an embodiment.

FIG. 6 is a cross-section 601 of the centrifuge tube illustrating the paddles 522 and divider plates 526, according to an embodiment. At the center of each divider plate is a hole 602. Referring back to FIG. 5, the holes 602 are formed with increasing diameter from the bottom (inflow end) to the top (outflow end) of the centrifuge. The variation in hole diameter acts to funnel the light phase 110 through the middle of the centrifuge to the light phase pickup tube 528. The heavy phase 112 collects around the perimeter of the centrifuge and grows in purity and clarity toward the top.

Four stainless steel sensor studs 202*a*, 202*b*, 206*a*, 206*b* are positioned at two different radial distances to determine electrical conductivity changes for both the heavy and light phases, as discussed previously. The sensors provide input to a controller (not shown) that operates solenoid pneumatic outflow valves 120, 122 that regulate the flow of the outgoing separated phases 530, 532 as described previously.

When the heavy phase solenoid outflow valve 122 is opened, the heavy phase fluid 112 flows from the perimeter of the centrifuge around the divider plate 130 and continues out through the top shaft portion 516 for the heavy phase to an upper shaft seal assembly 534. Inside the upper shaft seal assembly 534 is a radial pump 536 to increase the flow of the heavy phase. The heavy phase then flows out through the heavy phase solenoid outflow valve 122 and out of the unit as a relatively pure heavy phase stream 532 for collection, use, and/or further processing.

The light phase 110 travels through the light phase pickup tube 528, through the top shaft portion for the light phase 538 and also to the shaft seal assembly 534. The light phase then flows out through the light phase solenoid outflow valve 120 and out of the unit as a relatively pure light phase stream 530 for collection, use, and/or further processing.

Figure 7:
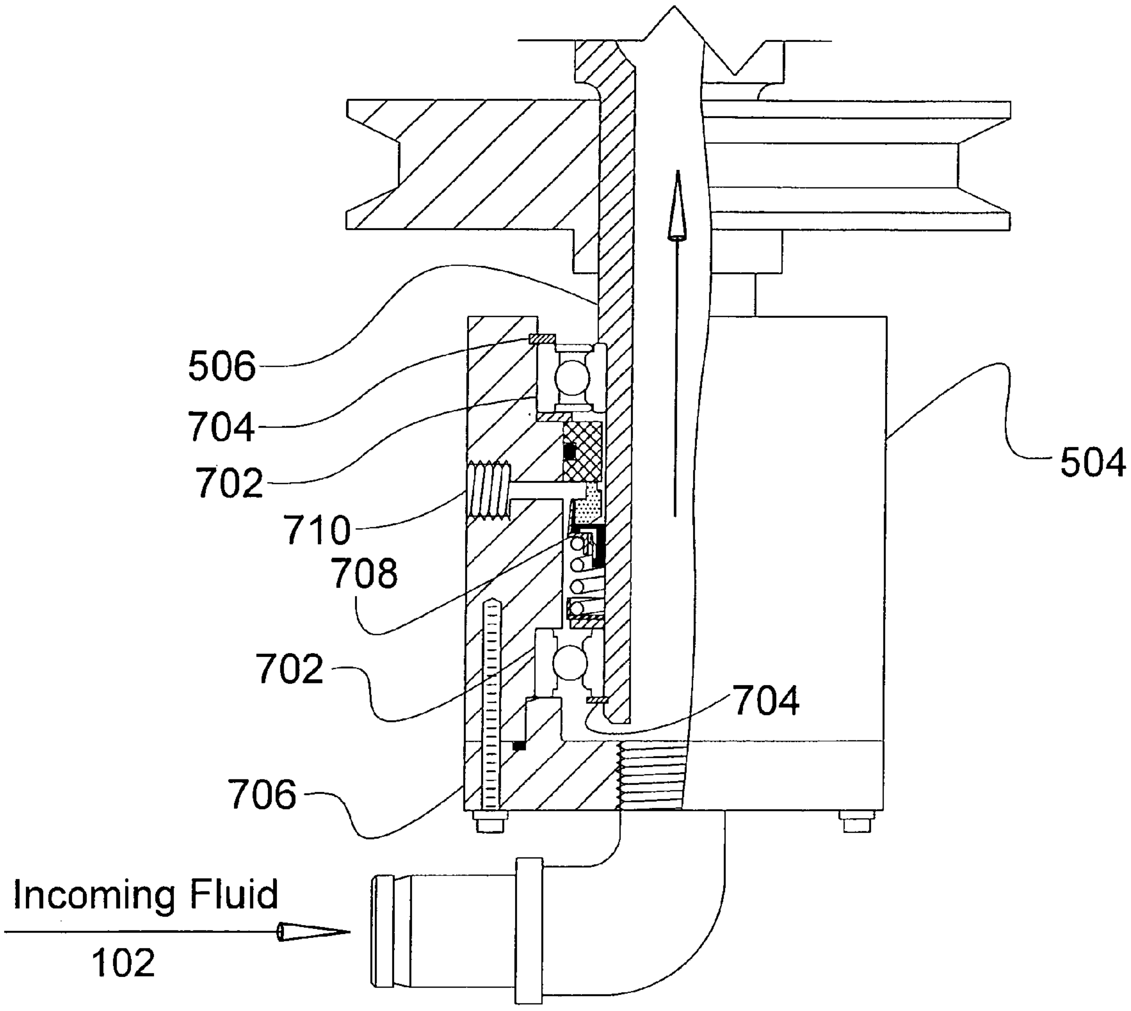
FIG. 7 is a partial cutaway view of the lower shaft seal according to an embodiment.

FIG. 7 is a partial cutaway view of the lower shaft seal 504, according to an embodiment. The structure of the lower shaft seal 504 may be similar to that of the upper shaft seal 534. The embodiment shown in FIG. 7 is a floating low friction design shaft seal. The ties that keep the seal from rotating are flexible braided tubes typically used for fluid transfer. Such a "soft" mount may help to improve tolerance to misalignment, increase service life, reduce cost, etc. The centrifuge shaft 502 is configured to rotate inside the non-rotating seal structure 504. Seal bearings 702 keep the seal structure centered on the shaft and provide support against side and/or thrust loads. Retaining clips 704 hold the bearings and seals in place. A cap 706 with O-ring seal is attached to provide access and service. Sealing surfaces 708 include mechanical carbon seals with ceramic seats. The elastomer portions may be Nitrile or Viton, for example, rated for use in biodiesel and methanol. A recirculation vent hole 710 is connected back to the incoming flow to remove air pockets during operation and startup.

Testing of the centrifuge has shown flow rates to allow up to 3 gallons per minute at 2200 RPM and up to 5 gallons per minute at 3750 RPM in biodiesel/glycerol separation. Under these conditions, the amount of glycerol detected in the biodiesel was consistent to the amount found in 8-12 hours of settling biodiesel and decanting glycerol and then settling the biodiesel for another 48 hours. Similar purity was found for the heavy phase (glycerol) product. Consistent with normal gravity settling, the amount of contamination was found to be related to temperature and amount of excess methanol in reaction, with higher temperatures and lower amounts of excess methanol tending to produce better separation.

In embodiments that use the simple designs and/or vertical orientation shown above, draining the unit to purge the fluid contents is made relatively simple and easy for batch processes or maintenance of continuous fluid processing. Cleaning of the centrifuge without opening it may also be performed due to the shape of centrifuge. According to an embodiment, the centrifuge body 104 is configured as a cylinder of substantially constant diameter. According to embodiments, the shapes of the internal structures may cause significant turbulence at low rotational velocity, thus aiding the cleaning action of wash water introduced through the inflow and/or outflow pipes. A cleaning cycle comprising flushing the centrifuge with hot wash water while the body 104 rotates at relatively low RPM. According to embodiments, the centrifuge body 104 has the capability to allow solid particulates to flow out with the heavy phase. According to embodiments, plastic pellets or other suitable solid media may thus be added to the wash water during the cleaning cycle to provide an accelerated scrubbing action.

The preceding overview, brief description of the drawings, and detailed description describe illustrative embodiments according to the present invention in a manner intended to foster ease of understanding by reader. Other structures, methods and equivalents may be within the scope of the invention. The scope of the invention described herein shall be limited only by the claims.

What is claimed is:

1. A control system for a centrifuge, comprising:

a fixed interface including a magnet and a wireless signal interface;

a sensor including a coil and a moving wireless signal interface configured to sense at least one physical parameter of one or more fluids within a centrifuge body and positioned to rotate with the centrifuge body past the fixed interface; and an electronic controller operatively coupled to the sensor through the wireless signal interfaces and operable to selectively output a control signal configured to control at least one valve responsive to the sensed physical parameter, wherein the sensor is configured to receive power responsive to the rotation of the centrifuge past the fixed magnet.

2. The control system for a centrifuge of claim 1, wherein the sensor includes a conductivity sensor.

3. The control system for a centrifuge of claim 2, wherein the conductivity sensor includes at least one conductivity sensor disposed at a radius of the rotating body.

4. The control system for a centrifuge of claim 3, wherein the conductivity sensor includes at least two conductivity sensors disposed at different radii of the rotating body.

5. The control system for a centrifuge of claim 4, wherein a first conductivity sensor is disposed at a relatively large radius corresponding to a minimum level of a heavy phase having a different conductivity from a light phase;

and wherein a second conductive stud is disposed at a relatively small radius corresponding to a maximum level of the heavy phase.

6. The control system for a centrifuge of claim 2, wherein the conductivity sensor is configured to transmit a conductivity signal responsive to at least one radial position of an interface between a conductive phase and a non-conductive phase.

7. The control system for a centrifuge of claim 1, wherein the coil and the moving wireless signal interface are separate.

8. The control system for a centrifuge of claim 1, wherein the coil is configured to at least intermittently power the sensor with induced current flow.

9. The control system for a centrifuge of claim 8, wherein the sensor further includes an amplifier configured to amplify an induced voltage to a sensor operating voltage.

10. The control system for a centrifuge of claim 1, wherein the magnet includes a permanent magnet.

11. The control system for a centrifuge of claim 10, wherein the permanent magnet includes a rare earth magnet.

12. The control system for a centrifuge of claim 1, wherein the sensor includes a first parameter sensing location at a relatively large radius and a second parameter sensing location at a radius less than the first parameter sensing location; and wherein the controller is configured to output a control signal to maintain a parameter value corresponding to a heavy phase at the first parameter sensing location and a parameter value corresponding to a light phase at the second parameter sensing location.

13. The control system for a centrifuge of claim 12, wherein the controller is further configured to filter the sensor signal.

14. The control system for a centrifuge of claim 13, wherein the controller is configured to filter the sensor signal by checking that a signal from the sensor is maintained for a minimum time prior to outputting the control signal.

15. The control system for a centrifuge of claim 12, wherein the parameter values include electrical conductivity.

16. The control system for a centrifuge of claim 1, wherein the wireless signal interface and the moving wireless signal interface form an optical interface.

17. The control system for a centrifuge of claim 16, wherein the moving wireless signal interface includes a light emitting diode and the wireless signal interface includes an optical sensor.

18. The control system for a centrifuge of claim 1, wherein the magnet and coil are configured to cooperate to provide an inductive power source for at least the sensor and the moving wireless signal interface responsive to rotation of the coil past the magnet.

19. The control system for a centrifuge of claim 1, wherein the controller is further configured to latch a state corresponding to the last received signal from the sensor; and determine the output control signal responsive to the latched state.

20. The control system for a centrifuge of claim 1, wherein the physical property includes at least one selected from the group consisting of: electrical conductivity, optical transmissivity, optical density, color, light scattering, index of refraction, temperature, thermal conductivity, thermal diffusivity, heat capacity, sonic response, ultrasonic response, viscosity, rotational inertia, electrical capacitance, electrical resistivity, magnetic reluctance, magnetic diffusivity, freezing point, melting point, boiling point, condensation point, triple point, material phase change, chemical reactivity, and radioactivity.

21. The control system for a centrifuge of claim 1, wherein the controller is further configured to output at least one control signal to operate the centrifuge in a wash mode.

22. The control system for a centrifuge of claim 21, wherein outputting at least one control signal to operate the centrifuge in a wash mode includes transmitting a signal to open a valve to admit a wash fluid and outputting a motor drive signal to drive a motor to a lower rotational velocity compared to when the centrifuge is operated to separate biodiesel from glycerol.

23. A method for operating a centrifuge, comprising:

rotating a centrifuge body including a sensor with an inductive element and a short range wireless transmitter to separate glycerol from biodiesel in a spun fluid including glycerol and biodiesel;

sensing at least one parameter corresponding to at least one phase interface location in the centrifuge body;

inducing current flow in the inductive element responsive to the rotation of the centrifuge and receiving a sensor signal from the short range wireless transmitter with at least one fixed interface disposed adjacent to the rotating centrifuge body; and controlling at least one fluid flow through the centrifuge body responsive to the received signal.

24. The method for operating a centrifuge of claim 23, wherein sensing at least one parameter corresponding to at least one phase interface location in the centrifuge body includes sensing a parameter corresponding to at least two locations in the centrifuge body.

25. The method for operating a centrifuge of claim 24, wherein the sensor signal is representative of the location of the phase interface in the centrifuge body.

26. The method for operating a centrifuge of claim 23, wherein controlling at least one fluid flow through the centrifuge body responsive to the received signal includes operating a light phase outflow valve to control the flow of biodiesel.

27. The method for operating a centrifuge of claim 23, wherein controlling at least one fluid flow through the centrifuge body includes operating a heavy phase outflow valve to control the flow of glycerol.

28. The method for operating a centrifuge of claim 27, when operating a heavy phase outflow valve includes opening the heavy phase outflow valve responsive to a sensed change in the at least one parameter.

29. The method for operating a centrifuge of claim 23, further comprising:

filtering the received signal.

30. The method for operating a centrifuge of claim 23, further comprising:

resetting a timer responsive to a change in the received signal; and wherein controlling at least one fluid flow through the centrifuge body responsive to the received signal includes driving a valve responsive to the change in the received signal after the timer has incremented or decremented to a completion value from the reset value.

31. The method for operating a centrifuge of claim 30, wherein resetting a timer responsive to a change in the received signal includes, if the timer is not already running, starting the timer when a signal above a threshold is received.

32. The method for operating a centrifuge of claim 30, wherein resetting a timer responsive to a change in the received signal includes, if the timer is already running, determining if the timer has incremented or decremented to the completion value.

33. The method for operating a centrifuge of claim 23, wherein the at least one fixed interface includes at least one magnet; and wherein the inductive element induces current flow to power the sensor responsive to rotation through a magnetic field provided by the at least one magnet.

34. The method for operating a centrifuge of claim 33, further comprising:

amplifying the induced current flow to a sensor operating voltage.

35. The method for operating a centrifuge of claim 23, wherein receiving the sensor signal from the short range wireless transmitter with at least one fixed interface includes receiving at least one intermittent optical signal.

36. The method for operating a centrifuge of claim 23, wherein receiving the sensor signal includes receiving the sensor signal intermittently as the short range wireless transmitter rotates past the at least one fixed interface.

37. The method for operating a centrifuge of claim 36, wherein the current flow is induced as the inductive element rotates past a magnet in the at least one fixed interface.

38. The method for operating a centrifuge of claim 23, wherein receiving a sensor signal from the short range wireless transmitter includes receiving an optical signal.

39. The method for operating a centrifuge of claim 23, wherein sensing at least one parameter includes sensing electrical conductivity.

40. The method for operating a centrifuge of claim 23, wherein inducing current flow includes magnetically inducing current flow; and wherein receiving a sensor signal from the short range wireless transmitter includes receiving the sensor signal via a non-inductive wireless modality.

41. The method for operating a centrifuge of claim 23, further comprising:

using the induced current flow to provide power to a sensor and the short range wireless transmitter.

42. The method for operating a centrifuge of claim 23, wherein receiving a sensor signal includes intermittently receiving a sensor signal, and further comprising:

latching the received sensor signal; and performing a comparison of the latched sensor signal to a sensor signal range.

43. The method for operating a centrifuge of claim 23, further comprising:

intermittently operating the centrifuge in a wash mode including admitting a wash fluid to the centrifuge body; and rotating the centrifuge body at a second rotational velocity lower than the rotational velocity.

44. The method for operating a centrifuge of claim 43, wherein the wash fluid is at a temperature elevated from ambient temperature.

45. A centrifuge, comprising:

a centrifuge body having at least one cavity and configured to rotate to separate a mixture of fluids within the at least one cavity;

a substantially fixed magnet;

at least one sensor configured to rotate with the centrifuge body and receive power inductively from the magnet responsive to the rotation of the centrifuge, and operable to detect at least one physical property of a fluid at a location within the cavity;

an electronic controller configured to receive a sensor signal from the sensor and responsively output at least one control signal; and at least one valve operatively coupled to the electronic controller and configured to control the flow of at least one fluid through the centrifuge body responsive to the at least one control signal.

46. The centrifuge of claim 45, wherein the at least one sensor is further configured to detect at least one physical property at two or more locations within the cavity; and wherein the controller is configured to generate the at least one control signal to maintain a difference between the at least one physical property detected at the two or more locations.

47. The centrifuge of claim 45, wherein the at least one valve includes a valve configured to allow flow of at least one of a heavy phase or a light phase out of the centrifuge responsive to the at least one control signal.

48. The centrifuge of claim 45, wherein the electronic controller is configured to latch a state corresponding to the last received signal from the sensor; and determine an operating parameter responsive to the latched state.

49. The centrifuge of claim 45, wherein the physical property includes one selected from the group consisting of: electrical conductivity, optical transmissivity, optical density, color, light scattering, index of refraction, temperature, thermal conductivity, thermal diffusivity, heat capacity, sonic response, ultrasonic response, viscosity, rotational inertia, electrical capacitance, electrical resistivity, magnetic reluctance, magnetic diffusivity, freezing point, melting point, boiling point, condensation point, triple point, material phase change, chemical reactivity, and radioactivity.

50. The centrifuge of claim 45, further comprising:

an inflow pipe concentric to the body and configured to provide a flow path for the fluid mixture to the body;

an outflow pipe concentric to the body and configured to provide separate first and second outflow paths for separated heavy and light phases of the fluid mixture;

a first shaft seal assembly configured for flexible mounting around the inflow pipe to substantially confine the fluid mixture to the centrifuge and inflow pipe; and a second shaft seal assembly configured for flexible mounting around the outflow pipe to substantially maintain separation between the separate outflow paths and to substantially confine the separated heavy and light phases of the fluid mixture to the interior of the outflow paths.

51. The centrifuge of claim 45, wherein the at least one sensor includes a wireless transmitter configured to rotate with the centrifuge body, and further comprising:

a substantially fixed interface configured to intermittently receive the sensor signal from the wireless transmitter and transmit the sensor signal to the controller.

52. The centrifuge of claim 51, wherein the wireless transmitter is configured to transmit an optical data signal.

53. The centrifuge of claim 45, wherein the at least one sensor includes a coil configured to induce current flow as it rotates past a magnet.

54. The centrifuge of claim 45, wherein the centrifuge body is configured to rotate at a first rotational velocity when separating the mixture of fluids and wherein the body is further configured to alternatively receive a wash fluid and rotate at a second rotational velocity lower than the first rotational velocity in a wash mode.

55. The centrifuge of claim 45, wherein the centrifuge body is operable to separate a mixture of fluids including at least one of vegetable oil and water, biodiesel and catalyst containing glycerol, biodiesel and glycerol, or biodiesel and wash water.

* * * * *

UNITED STATES PATENT AND TRADEMARK OFFICE

CERTIFICATE OF CORRECTION

PATENT NO. : 7,635,328 B2
APPLICATION NO. : 11/636396
DATED : December 22, 2009
INVENTOR(S) : Hinman et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 498 days.

Signed and Sealed this

Twenty-first Day of December, 2010

David J. Kappos

*Director of the United States Patent and Trademark Office*